(No Model.)
J. T. COLLIER.
ATTACHMENT FOR COTTON PLOWS.
No. 418,686. Patented Jan. 7, 1890.
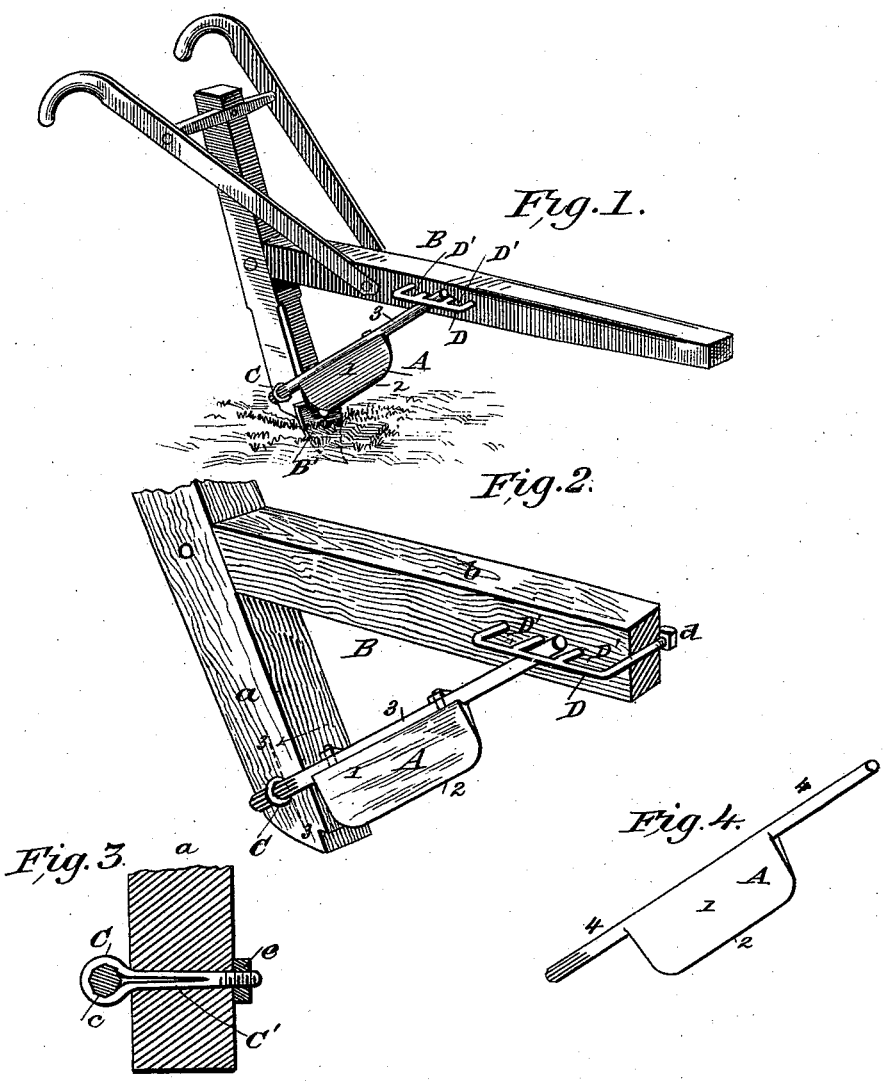
WITNESSES:
Fred G. Dieterich
A. M. Darrell
John T Collier INVENTOR
BY
A. M. Kenaday
ATTORNEY

UNITED STATES PATENT OFFICE.

JOHN T. COLLIER, OF COFFEEVILLE, TEXAS.

ATTACHMENT FOR COTTON-PLOWS.

SPECIFICATION forming part of Letters Patent No. 418,686, dated January 7, 1890.

Application filed June 12, 1889. Serial No. 314,009. (No model.)

*To all whom it may concern:*

Be it known that I, JOHN T. COLLIER, a citizen of the United States, residing at Coffeeville, in the county of Upshur and State of Texas, have invented certain new and useful Improvements in Gage Attachments for Cotton-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates more particularly to an adjustable gage or fender for cotton and corn plows; and it has for its object to provide a gage of such character which can be readily adjusted so as to push much or little dirt toward the plants, as the size of the plants may require.

To this end my invention consists in the peculiar construction and combination of parts, as will hereinafter be fully described in the annexed specification, and particularly pointed out in the claims, reference being had to the accompanying drawings, in which—

Figure 1 is a perspective view of a cotton-plow with my improvement applied. Fig. 2 is a detail perspective view illustrating the gage and its attachment to the plow-stock. Fig. 3 is a section on the line 3 3, Fig. 2; and Fig. 4 is a detail view, hereinafter referred to.

In the accompanying drawings, A denotes my improved adjustable gage or fender plate, which is attached to the plow-standard $a$ at its lower end and to the plow-beam $b$ at its upper end, in a manner which I will presently describe.

The plow B, to which my attachment is usually attached, may be a shovel, scooter, sweep, or turning plow, and which is provided with the usual plow-blade B', as shown.

In adjusting the fender-plate A it is disposed diagonally above the upper part or head of the plow in a manner clearly shown in the drawings. This plate is made of a piece of steel, and is formed of a body portion 1, provided with a cutting-edge 2 at its front, as shown. The body portion may be secured to a rod 3, as shown in Figs. 1 and 2, or it may be of a solid piece provided with extensions 4 4 at each end, which journal in staples C and D, as clearly shown in Fig. 4 of the drawings.

The staple C, which forms the bearing for the lower end of the gage, is formed with an octagonal aperture $c$, into which is inserted the lower end of the rod 3 or extended portion 4 of the fender, which is also octagonal in cross-section.

The staple D, which is secured to the beam, consists of a series of bails D', in either of which the upper end of the rod 3 or extension 4 may be adjusted.

The staples C and D have their ends passed through the standard and the beam, respectively, and are held in place by nuts $d$ $e$.

The stem C' of the staple C may be split, as shown, so that the staple will bind against the lower end of the rod when the nut is adjusted, and thereby hold the said end in its proper adjusted position.

From the foregoing description, taken in connection with the drawings, the advantages and operation of my improvement will readily appear. It will be seen that if it is desired to work small plants and to push but a small amount of dirt to them the upper end of the fender is adjusted in the forward bail D' of the staple D, and if it is desired to push the dirt slightly outward the fender may be adjusted in its lower bearing, so as to turn slightly outward.

In working large plants and where it is desired to push a large quantity of dirt to the plants the fender is adjusted in its lower bearing, so as to throw the same outward almost at right angles to the plow, and the upper end is adjusted in the rear bail D' of the staple D.

By tightening the nut $e$ the fender can be fixedly held in any desired position. By this arrangement I am able to cover up all the young grass around the plants, and thereby preserve them.

My invention is of a very simple construction, can be readily applied to any plow-stock, can be produced at a very small cost, and supplies a great need in cotton-cultivating— that of doing away with hoeing.

If desired, my improvement, instead of being applied to the right side of the plow, as shown, may be secured upon the left side, and be used in connection with a turning-shovel, so as to permit of plowing and scraping at the same time.

Having thus described my invention, what I claim, and desire to secure by Letters Patent, is—

1. The combination, with the plow-stock provided with a staple C near the lower end of the standard, having an opening formed with a series of parallel sides, and a staple D on the beam, as shown, consisting of a series of bails D' of the fender-plate A, rigidly secured to the rod 3, the lower end of said rod being formed in cross-section of a series of parallel sides, said end adapted to fit and be adjusted in said staple C, the upper end of the rod being adapted to be adjusted in any one of the bails D' of the staple, substantially as and for the purpose described.

2. The combination, with the plow-stock provided with a staple D, formed of a series of bails D', on one side of the plow-beam, as shown, of the fender-plate A, provided with an upward extension or journal adapted to be held in said staple D and to be rotatably adjusted therein, a downward extension formed octagonal in cross-section, a staple having a split shank and formed with an octagonal aperture adapted to receive the lower extension of the plate A, said staple adapted to be inserted through the plow-standard, and means for closing the split shank-sections and holding said staple to the plow-standard, substantially as shown, and for the purpose described.

In testimony whereof I affix my signature in presence of two witnesses.

JNO. T. COLLIER.

Witnesses:
W. M. SMITH,
RUFUS R JONES.